United States Patent
Gaber et al.

(10) Patent No.: US 12,169,557 B2
(45) Date of Patent: Dec. 17, 2024

(54) PRIVACY PRESERVING ENSEMBLE LEARNING AS A SERVICE

(71) Applicant: EMC IP Holding Company LLC, Hopkinton, MA (US)

(72) Inventors: Shiri Gaber, Beer Sheva (IL); Ohad Arnon, Beit-Nir (IL); Dany Shapiro, Alfei Menashe (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 550 days.

(21) Appl. No.: 17/351,569

(22) Filed: Jun. 18, 2021

(65) Prior Publication Data
US 2022/0405386 A1    Dec. 22, 2022

(51) Int. Cl.
| | |
|---|---|
| *H04L 9/00* | (2022.01) |
| *G06F 21/55* | (2013.01) |
| *G06N 3/045* | (2023.01) |
| *G06N 3/08* | (2023.01) |
| *G06N 20/20* | (2019.01) |

(52) U.S. Cl.
CPC .............. *G06F 21/55* (2013.01); *G06N 3/045* (2023.01); *G06N 3/08* (2013.01); *G06N 20/20* (2019.01)

(58) Field of Classification Search
CPC ................................ G06N 20/20; G06N 3/045
USPC ............................................................ 726/2
See application file for complete search history.

(56) References Cited

U.S. PATENT DOCUMENTS

| | | | | |
|---|---|---|---|---|
| 11,223,543 B1* | 1/2022 | Fauber | ................. | G06N 3/084 |
| 11,245,726 B1* | 2/2022 | Kats | .................... | G06N 20/00 |
| 11,494,486 B1* | 11/2022 | Kim | ..................... | G06N 3/045 |
| 2020/0012902 A1* | 1/2020 | Walters | ............... | G06F 16/9038 |
| 2022/0092411 A1* | 3/2022 | Shin | ......................... | G06N 3/08 |

OTHER PUBLICATIONS

Kubara Kacper, "GANs and Missing Data Imputation New Methods of Missing Data Imputation with Generative Adversarial Networks", http://towardsdatascience.com/gans-and-missing-data-imputation-815a0cbc4ece, Aug. 5, 2019, 9 pages.

(Continued)

*Primary Examiner* — Christopher J Brown
(74) *Attorney, Agent, or Firm* — Chamberlain, Hrdlicka, White, Williams & Aughtry; Aly Dossa (57) ABSTRACT

Techniques described herein relate to a method for predicting results using ensemble models. The method may include receiving trained model data sets from a model source nodes, each trained model data set comprising a trained model, an important feature list, and a missing feature generator; receiving a prediction request data set; making a determination that the prediction request data set does not include an input feature for a trained model; generating, based on the determination and using a missing feature generator, a substitute feature to replace the input feature; executing the trained model using the prediction request data set and the substitute feature to obtain a first prediction; executing a second trained model using the prediction request data set to obtain a second prediction; and obtaining a final prediction using the first prediction, the second prediction, and an ensemble model.

20 Claims, 3 Drawing Sheets

(56) References Cited

OTHER PUBLICATIONS

Rist Lukas, "Encrypt your Machine Learning. How Practical is Homomorphic Encryption for Machine Learning?", https://medium.com/corti-ai/encrypt-your-machine-learning-12b113c879d6, Jan. 8, 2018, 10 pages.

Singh et al., "An Ensemble Approach for feature selection of Cyber Attack Dataset", International Journal of Computer Science and Information Security, 2009, 7 pages, vol. 6, No. 2, 7 pages.

* cited by examiner

PRIVACY PRESERVING ENSEMBLE LEARNING AS A SERVICE

BACKGROUND

Extensive data sets from a variety of sources often improve learning results for machine learning (ML) algorithms. However, various entities are often unable to share data with one another, as it may be subject to privacy restrictions, represent valuable company intellectual property, etc. Existing solutions for sharing such data often involve encryption (e.g., homomorphic encryption), which may add significant overhead to the cost of sharing data, for example, in terms of compute resources needed to process the data and/or network resources to transmit the data.

SUMMARY

In general, embodiments described herein relate to a method for predicting results using ensemble models. The method may include receiving a first trained model data set from a first model source node, the first trained model data set comprising a first trained model, a first important feature list, and a first missing feature generator; receiving a second trained model data set from a second model source node, the second trained model data set comprising a second trained model, a second important feature list, and a second missing feature generator; receiving a prediction request data set; making a first determination that the prediction request data set does not include an input feature for the first trained model; generating, based on the first determination and using the first missing feature generator, a first substitute feature to replace the input feature; executing the first trained model using the prediction request data set and the first substitute feature to obtain a first prediction; executing the second trained model using the prediction request data set to obtain a second prediction; and obtaining a final prediction using the first prediction, the second prediction, and an ensemble model.

In general, embodiments described herein relate to a non-transitory computer readable medium that includes computer readable program code, which when executed by a computer processor enables the computer processor to perform a method for predicting results using ensemble models. The method may include receiving a first trained model data set from a first model source node, the first trained model data set comprising a first trained model, a first important feature list, and a first missing feature generator; receiving a second trained model data set from a second model source node, the second trained model data set comprising a second trained model, a second important feature list, and a second missing feature generator; receiving a prediction request data set; making a first determination that the prediction request data set does not include an input feature for the first trained model; generating, based on the first determination and using the first missing feature generator, a first substitute feature to replace the input feature; executing the first trained model using the prediction request data set and the first substitute feature to obtain a first prediction; executing the second trained model using the prediction request data set to obtain a second prediction; and obtaining a final prediction using the first prediction, the second prediction, and an ensemble model.

In general, embodiments described herein relate to a system for predicting results using ensemble models. The system may include a model aggregator comprising memory and a processor comprising circuitry, operatively connected to a plurality of model source nodes, and configured to receive a first trained model data set from a first model source node, the first trained model data set comprising a first trained model, a first important feature list, and a first missing feature generator; receive a second trained model data set from a second model source node, the second trained model data set comprising a second trained model, a second important feature list, and a second missing feature generator; receive a prediction request data set; make a first determination that the prediction request data set does not include an input feature for the first trained model; generate, based on the first determination and using the first missing feature generator, a first substitute feature to replace the input feature; execute the first trained model using the prediction request data set and the first substitute feature to obtain a first prediction; execute the second trained model using the prediction request data set to obtain a second prediction; and obtain a final prediction using the first prediction, the second prediction, and an ensemble model.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures.

In the below description, numerous details are set forth as examples of embodiments described herein. It will be understood by those skilled in the art, that also have the benefit of this Detailed Description, that one or more embodiments of embodiments described herein may be practiced without these specific details and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

In general, embodiments described herein relate to methods, systems, and non-transitory computer readable mediums storing instructions for privacy preserving collaborative ensemble learning as a service. In one or more embodiments, an ensemble learning model may be deployed on a central node (referred to herein as a model aggregator). In one or more embodiments, the central node receives trained model data sets from any number of operatively connected model source nodes, one of which may or may not be itself. In one or more embodiments, the trained model data sets each include a trained ML model, a list of features important to the model's performance, and an algorithm (e.g., a generative adversarial network (GAN)) suitable for use in generating feature data when features are missing that the ML model expects to receive as input when making a prediction, which may be referred to herein as a missing feature generator.

In one or more embodiments, when a prediction is to be made (e.g., whether a given file is malicious in some way), data corresponding to the prediction request is used as input for each of the trained ML models received from the model source nodes. In one or more embodiments, any features that a given model expects as input that are missing from the data associated with the prediction request are filled in with data using the missing feature generator associated with the ML model. In one or more embodiments, each of the trained models produces a result. In one or more embodiments, the results are then used as input to an ensemble model deployed on the model aggregator, and used to produce a result (e.g., a prediction) in response to the request.

Quality and extensive datasets may provide better results for solving problems across different domains, leveraging the power of sophisticated ML algorithms. However, a significant limitation that exists is the fact that different/rival entities often cannot share private data which constitutes a significant part of an entities' intellectual property and/or is subject to privacy restrictions (e.g., based on statutes that exist in certain jurisdictions). Therefore, in one or more embodiments, a framework is required in order to allow entities to share their ML models and accompanying insights, as opposed to private data.

As an example, there exist many different models, developed by different companies, to detect cyber-attacks (e.g., fraud, phishing, malware, etc.). None of these models provide perfect detection and, in many cases, performance on real-time data is poor. Due to the need to protect sensitive data, such as intellectual property, cyber companies often do not collaborate by sharing source data in order to improve their detection rate. Additionally, there are several cyber detection engines hubs that exist (e.g., VirusTotal by Google). Such engines may aggregate any number of anti-virus-type products and online scan engines to check for threats that a user's own protection measures may have missed, or to verify against any false-positives. However, these hubs provide a prediction per engine (i.e., no single answer is provided), and let the user decide whether a file is a malware or not, which may not be desirable.

To help address the problems described above, one or more embodiments described herein provide a service in which various entities may participate, thereby leveraging the concept of the wisdom of crowds. In one or more embodiments, the service serves as a central hub, which uses ML models from participant entities to enable solutions for a wide range of problems in domains such as marketing, medicine, semiconductors, cyber security, etc., while protecting participants' intellectual property, and providing a single result per user query requesting a result (e.g., a prediction).

In one or more embodiments, in the first stage of the training, ML models are trained separately by individual entities using their own private data, with each ML model trying to solve the same or similar problem in a specific domain (e.g. phishing, monitoring, fraud, malware detection, etc.). Each entity may have its own specific feature set, which may overlap to some extent with the feature set used by other entities.

In one or more embodiments, once the models are trained, entities choosing to collaborate (i.e., participants) may share their respective trained ML models with a centralized platform (i.e., a model aggregator), along with ML model feature importance, which may be an attribute of the trained model object shared by the respective participants. In one or more embodiments, the important features for a given ML model from a participant are critical features which must be provided as input for the ML model. In one or more embodiments, each participant also provides a missing feature generator in conjunction with its trained ML model, which may be used to generate features needed as input for the trained ML model in situations where such features are missing from a dataset to be analyzed. Such a missing feature generator may, for example, generate missing feature data based on the data structures and correlations. As an example, GANs may be used as missing feature generators. In one or more embodiments, the missing feature generator may be used to generate any feature required as input for a trained model that is not included in the important feature list associated with the model.

Next, in one or more embodiments, an ensemble model is trained using output from each individual model. In one or more embodiments, the training set for the ensemble model is generated by applying the models on any data available to the model aggregator (e.g., publicly available data, private data owned by the hub service provider, etc.). In one or more embodiments, any necessary input features for the individual models that are missing from the training data set are generated using the missing feature generator corresponding to the model for which one or more input features are missing. In one or more embodiments, the output predictions of the individual ML models, along with accuracy measures from each of the ML models, are then used as input (e.g., merged into a feature vector) for training the ensemble model. As an example, an ensemble approach using a variety of classifiers classifies cyber-attacks based on the union of the subsets of ensemble model input features (i.e., individual models' outputs). In one or more embodiments, the same process is applied on users' data to provide an improved prediction when such a prediction is requested.

Unlike former approaches, embodiments described herein provide the ability to use several different engines, each trained on different datasets and developed and/or maintained by different entities, while getting one single superior result. Such embodiments may preserve the privacy and/or the intellectual property of any participant entity involved in the collaboration. Additionally, one or more embodiments described herein are relatively efficient in terms of computation and communication, as they only require the sharing of trained models, important feature lists, and missing feature generators, with no need to transmit the underlying data, encrypted or otherwise.

Figure 1:
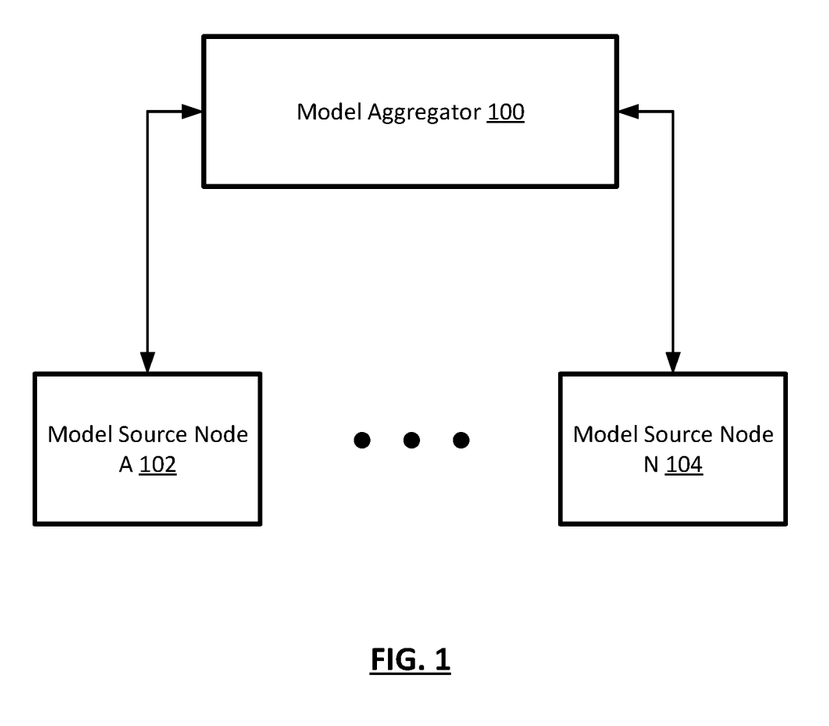
FIG. 1 shows a diagram of a system in accordance with one or more embodiments of the invention.

FIG. 1 shows a diagram of a system in accordance with one or more embodiments described herein. The system may include a model aggregator (100) operatively connected to any number of model source nodes (e.g., model source node A (102), model source node N (104)). Each of these components is described below.

In one or more embodiments, the model source nodes (102, 104) may be computing devices. In one or more embodiments, as used herein, a model source node (102, 104) is any computing device, collection of computing devices, portion of one or more computing devices, or any other logical grouping of computing resources.

In one or more embodiments, a computing device is any device, portion of a device, or any set of devices capable of electronically processing instructions and may include, but is not limited to, any of the following: one or more processors (e.g. components that include integrated circuitry) (not shown), memory (e.g., random access memory (RAM)) (not shown), input and output device(s) (not shown), non-volatile storage hardware (e.g., solid-state drives (SSDs), hard disk drives (HDDs) (not shown)), one or more physical interfaces (e.g., network ports, storage ports) (not shown), any number of other hardware components (not shown), and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer, automobile computing system, and/or any other mobile computing device), a storage device (e.g., a disk drive array, a fibre channel storage device, an Internet Small Computer Systems Interface (iSCSI) storage device, a tape storage device, a flash storage array, a network attached storage device, an enterprise data storage array etc.), a network device (e.g., switch, router, multi-layer switch, etc.), a virtual machine, a virtualized computing environment, a logical container (e.g., for one or more applications), and/or any other type of computing device with the aforementioned requirements. In one or more embodiments, any or all of the aforementioned examples may be combined to create a system of such devices, which may collectively be referred to as a computing device or model source node (102, 104). Other types of computing devices may be used as model source nodes without departing from the scope of embodiments described herein.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums storing software and/or firmware.

Such software and/or firmware may include instructions which, when executed by the one or more processors (not shown) or other hardware (e.g. circuitry) of a computing device and/or system of computing devices, cause the one or more processors and/or other hardware components to perform operations in accordance with one or more embodiments described herein.

The software instructions may be in the form of computer readable program code to perform methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

In one or more embodiments, a model source node (102, 104) includes functionality to generate or otherwise obtain any amount or type of feature data that is related to any problem for which a ML model may be used to predict a result. As used herein, a feature refers to any type or category of information that may be relevant for an ML model to make a prediction. For example, an ML model may be designed to predict whether a given file includes content that is malicious in some way. To make such a prediction, the ML model may be provided as input any number of features, such as file name, file content, file size, source of the file, etc. Each of the aforementioned input variables may be considered a feature. One of ordinary skill in the art will appreciate that there may be any number of features relevant to a given problem domain. As such, features are not limited to the examples provided herein.

In one or more embodiments, each model source node (102, 104) also includes functionality to use feature data as input to train an ML model. A model source node may train any number of ML models of any type using any amount of feature data as input. As non-limiting examples, the ML model may be regression models, Bayesian models, decision tree models, random forest models, nearest neighbor models, support vector machine models, clustering models, etc. The one or more types of ML models trained by model source nodes (102, 104) are not limited by the aforementioned examples, and any other type of ML model may be used without departing from the scope of embodiments described herein.

In one or more embodiments, each model source node also includes functionality to generate a list of important features for a given ML model trained at the model source node. In one or more embodiments, an important feature is any feature that has a statistically significant impact on the result produced by an ML model. In one or more embodiments, important/relevant features are derived using the ML model training itself, for ML models that inherently provide feature importance. As an example, a random forest algorithm ML model produces a weighted ranking of features, and features having a weight over a feature importance threshold may be deemed as important features. As another example, the model analyzer may use other techniques, such as Fisher Score, Importance Gain, etc. to determine a set of one or more relevant features. Any scheme for determining which features are important for an ML model may be used by a model source node (102, 104) without departing from the scope of embodiments described herein.

In one or more embodiments, each model source node (102, 104) also includes functionality to generate or otherwise obtain a missing feature generator corresponding to an ML model trained by the model source node. Any scheme for generating missing features may be used without departing from the scope of embodiments described herein. As an example, a GAN may be created based on the feature data used to train the ML model, for use in imputing feature values required as input for a ML model when such values are unavailable. In one or more embodiments, a GAN may provide values for missing features based on the data structure and correlations within the training data. In one or more embodiments, given a training set, a GAN learns to generate new data with the same statistics as the training set, by using two adversarial networks. In one or more embodiments, a missing feature generator, such as a GAN is included, along with a trained model and an important feature list, in trained model data sets that are transmitted from model source nodes (102, 104) to a model aggregator (100).

In one or more embodiments, the system also includes a model aggregator (100). In one or more embodiments, the model aggregator (100) is operatively connected to the model source nodes (102, 104). A model aggregator (100) may be separate from and operatively connected to any number of model source nodes (102, 104). In one or more embodiments, the model aggregator (100) is a computing device (described above).

In one or more embodiments, the model aggregator (100) includes functionality to receive trained model data sets from any number of model source nodes (102, 104). In one or more embodiments, the model aggregator (100) also includes functionality to use the trained model data sets to train an ensemble model and/or to produce results, such as predictions, based on input data from entities making a request for the result (e.g., is a given file a virus).

In one or more embodiments, the model source nodes (102, 104) and the model aggregator (100) are operatively connected via a network (not shown). A network may refer to an entire network or any portion thereof (e.g., a logical portion of the devices within a topology of devices). A network may include a datacenter network, a wide area network, a local area network, a wireless network, a cellular phone network, or any other suitable network that facilitates the exchange of information from one part of the network to another. A network may be located at a single physical location, or be distributed at any number of physical sites. In one or more embodiments, a network may be coupled with or overlap, at least in part, with the Internet.

While FIG. 1 shows a configuration of components, other configurations may be used without departing from the scope of embodiments described herein. Accordingly, embodiments disclosed herein should not be limited to the configuration of components shown in FIG. 1.

Figure 2:
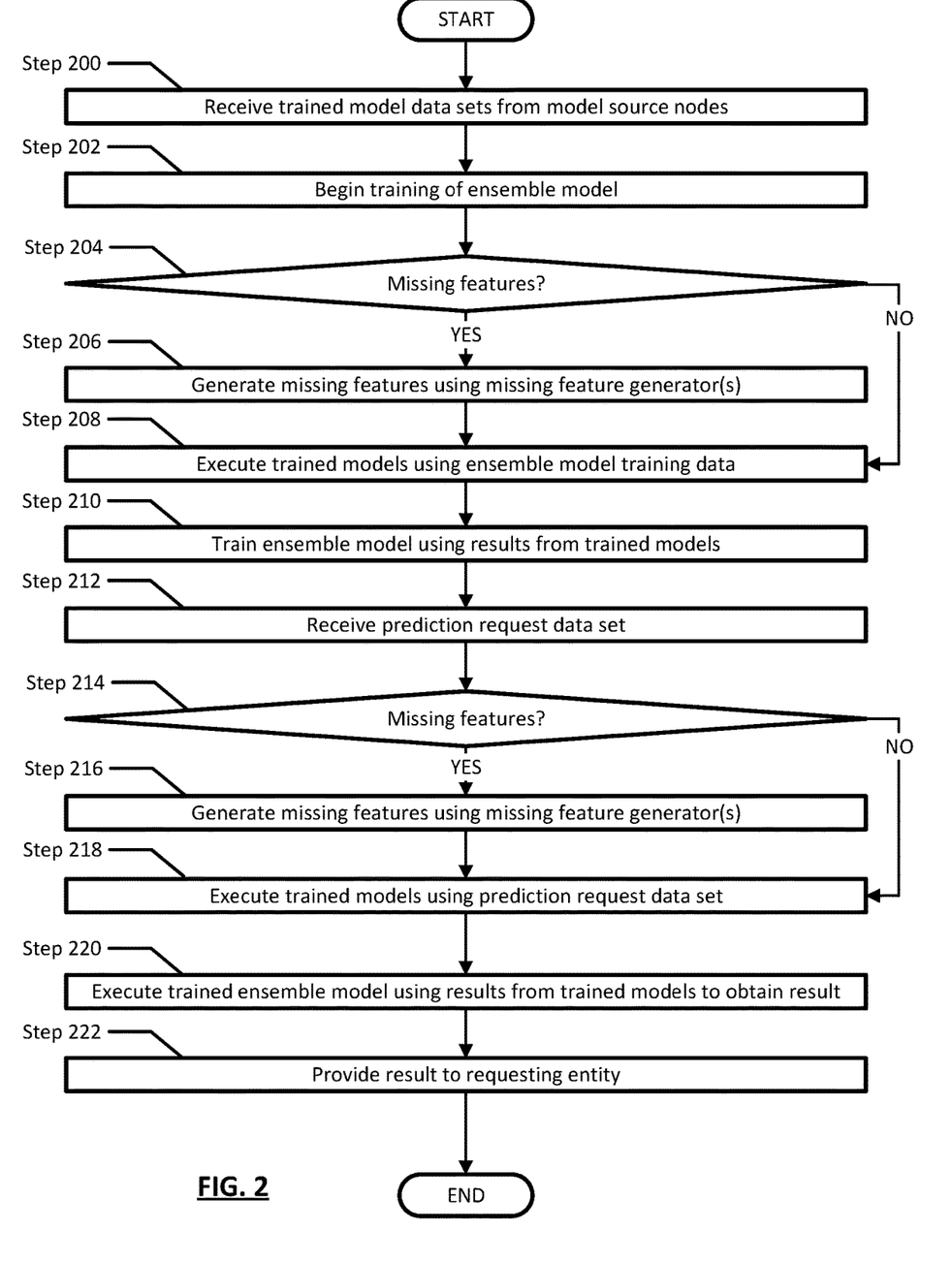
FIG. 2 shows a flowchart in accordance with one or more embodiments of the invention.

FIG. 2 shows a flowchart describing a method privacy preserving ensemble learning as a service in accordance with one or more embodiments disclosed herein.

While the various steps in the flowchart shown in FIG. 2 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel with other steps of FIG. 2.

In Step 200, trained model data sets are received from model source nodes. In one or more embodiments, prior to Step 200, any number of model source nodes have used respective source data available to them to train ML models in relation to a particular problem or domain. In one or more embodiments, the data used by the individual model source nodes may represent proprietary data that the model source nodes, or the entities in control of the model source nodes, do not wish to, or cannot, share outside the entity. For example, the data may relate to proprietary intellectual property, be subject to privacy restrictions, etc. In one or more embodiments, such data is used to train any type of ML model for producing a result. As an example, the ML model may be trained to identify, based on input data, phishing schemes, fraud, malware, etc.

In one or more embodiments, also prior to Step 200, the model source nodes also generate a list of important features. In one or more embodiments, an important feature is a feature (i.e., an input for the model) that is particularly relevant to the result produced by the model. In one or more embodiments, important features are generated as an inherent feature of the ML model being trained. Additionally or alternatively, the important features may be generated using any other scheme for deriving which features are important to ML model results.

In one or more embodiments, also prior to Step 200, the model data sources also generate or otherwise obtain a missing feature generator for the ML model being trained. In one or more embodiments, a missing feature generator is an algorithm for generating any missing feature data. In one or more embodiments, missing feature data is any data or values required as input for a given ML model that are not present in a data set intended as input to the ML model. In one or more embodiments, the missing feature generator may be any algorithm suitable for generating missing feature data. As an example, the missing feature generator may be a GAN, which may use feature statistics and correlations from the data set used to train an ML model to impute feature data values to fill in missing feature data required for input to an ML model. In one or more embodiments, the missing feature generator is used to generate missing features that are not features included in the important feature list associated with a given ML model.

In one or more embodiments, the trained model, the important feature list, and the missing feature generator are included in the trained model data set provided from the respective model source nodes. In one or more embodiments, the trained model data sets are provided to a model aggregator. The trained model data sets may be transmitted to the model aggregator using any scheme for transmitting information. As an example, the trained model data sets may be transmitted from the various model source nodes to the model aggregator using an operative connection between the model source node and the model aggregator, with such operative connection being, at least in part, part of a network. Any number of trained model data sets may be received by a model aggregator without departing from the scope of embodiments described herein.

In Step 202, the trained model data sets obtained in Step 200 are used to begin training of an ensemble model of the model aggregator. In one or more embodiments, the model aggregator includes any type of ensemble model that uses as input the results from other trained ML models to produce a single result. In one or more embodiments, the model aggregator has access to a training data set from any source that is to be used to train the ensemble model. For example, the model aggregator may have access to a publicly available data set, may have a corpus of private data owned by the entity that controls the model aggregator, etc. In one or more embodiments, beginning training of the ensemble model includes using the data set available to the model aggregator as input to the trained ML models received in Step 200.

In Step 204, a determination is made as to whether there are any missing features for any of the trained ML models. In one or more embodiments, if any of the features required for input for a given trained ML model are missing, the method proceeds to Step 206. In one or more embodiments, if there are no missing features, the method proceeds to Step 208. In one or more embodiments, although not shown in FIG. 2, if any missing features are determined to be important features, which may be determined from the trained model data sets, then an alternative action may need to be taken for the ML model for which an important feature is determined to be missing. As an example, the ML model for which an important input feature is missing may be excluded from further training of the ensemble model. As another example, the method may end, as it is not able to continue if an important feature needed as input for one of the trained model is missing from the training data set used by the model aggregator. In one or more embodiments, a missing feature generator is not used to generate missing features for a trained ML model that are included in the important feature list for the trained ML model.

In Step 206, any missing features identified in Step 204 are generated using one or more missing feature generators. In one or more embodiments, the assessment as to whether there are any missing features is made on a per trained ML model basis for each trained ML model received from a model source node in Step 200. In one or more embodiments, when a missing feature needed as input for one of the ML models is identified, the missing feature generator provided by the model source node that provided the ML model is used to generate a value for the missing feature. In one or more embodiments, such a process is used to generate all missing features for all trained ML models received from the model source nodes, each time using a respective missing feature generator corresponding to the ML model for which a missing feature is identified. In one or more embodiments, the missing feature generator is a GAN provided by the model source node along with the trained ML model as part of the trained model data set. In one or more embodiments, a missing feature generator is not used to generate missing features for a trained ML model that are included in the important feature list for the trained ML model.

In Step 208, the trained models received from the model source nodes in Step 200 are executed using ensemble model training data. As described above, ensemble model training data may be any data set available to the model aggregator. In one or more embodiments, if missing features were identified in Step 204, and values for the same were generated in Step 206, then the trained ML models are executed using the ensemble model training data set and the missing feature values. In one or more embodiments, if there were no missing features, then the trained ML models may be executed using the ensemble model training data set without any missing feature values.

In Step 210, the ensemble model of the model aggregator is trained. In one or more embodiments, the ensemble model is trained using the outputs/results obtained by executing the trained ML models in Step 208. In one or more embodiments, there may be any number of rounds of training of the ensemble model by executing the trained ML models received from the model source nodes and using the results therefrom as input to the ensemble model. In one or more embodiments, any technique may be used by the ensemble model to produce a single result using the variety of results obtained from the execution of the trained ML models, including, but not limited to, averaging, weighted averaging, determining a result that appears most frequently, etc. In one or more embodiments, once the ensemble model is trained, it is ready to produce results (e.g., provide predictions) based on real world data provided for use as input data.

In Step 212, a prediction request data set is received. In one or more embodiments, the prediction request data set is received using any scheme by which data may be received. For example, a prediction request data set may be received via a network connection. In one or more embodiments, the prediction request data set is received from a requesting entity. Additionally or alternatively, the prediction request data set may be partially received from the requesting entity, and partially obtained elsewhere based on the portion received from the requesting entity.

In Step 214, a determination is made as to whether the prediction request data set has any missing features for any of the trained ML models from the model source nodes. In one or more embodiments, if any of the features required for input for a given trained ML model are missing, the method proceeds to Step 216. In one or more embodiments, if there are no missing features, the method proceeds to Step 218.

In Step 216, any missing features identified in Step 214 are generated using one or more missing feature generators. In one or more embodiments, the assessment as to whether there are any missing features is made on a per trained ML model basis for each trained ML model received from a model source node in Step 200. In one or more embodiments, when a missing feature needed as input for one of the ML models is identified, the missing feature generator provided by the model source node that provided the ML model is used to generate a value for the missing feature. In one or more embodiments, such a process is used to generate all missing features for all trained ML models received from the model source nodes, each time using a respective missing feature generator corresponding to the ML model for which a missing feature is identified. In one or more embodiments, the missing feature generator is a GAN provided by the model source node along with the trained ML model as part of the trained model data set.

In Step 218, the trained models received from the model source nodes in Step 200 are executed using prediction request data set. As described above, the prediction request data set may be a set of data received by a model aggregator from an entity requesting a prediction from the ensemble model and/or any additional data obtained based on the received data. In one or more embodiments, if missing features were identified in Step 214, and values for the same were generated in Step 216, then the trained ML models are executed using the prediction request data set and the missing feature values. In one or more embodiments, if there were no missing features, then the trained ML models may be executed using the prediction request data set without any missing feature values.

In Step 220, the ensemble model is executed using the result obtained from the execution of the trained ML models in Step 218. In one or more embodiments, the results of the trained ML models are used as input values for the ensemble model. In one or more embodiments, the ensemble model produces a single result based on the variety of input results from the trained ML models.

In Step 222, the prediction results are transmitted to the entity that requested the prediction. In one or more embodiments, the prediction is provided to the entity using any scheme for transmitting data. As an example, the results may be transmitted to the requesting entity using an operative connection between the model aggregator and the requesting entity facilitated, at least in part, by a network.

Example Use Case

The above describes systems and methods for producing a single result from an ensemble model using any number of trained models received from different entities, so that such entities only have to share trained ML models, and not the data used to train the ML models. As such, one of ordinary skill in the art will recognize that there are many variations of how such ML model training may occur, and how prediction results may be produced. However, for the sake of brevity and simplicity, consider the following simplified scenario to illustrate, at least in part, the concepts described herein. The example described below is not intended to limit the scope of the invention.

Consider a scenario in which detection of uniform resource locators (URLs) used for phishing attacks is desired. In such a scenario, any number of different entities may develop, train, and use an ML model for use in predicting whether a given URL is likely to be a phishing attempt. Each such entity may use its own data, obtained from sources available to the entity using a given ML model. However, each such entity may use a different data set. As such, each entity misses the benefit of training on a broader set of data available to other entities.

In such a scenario, each entity may elect to participate in a collaborative ensemble scheme in which, instead of sharing the data used to train their respective Ml models, each entity wishing to participate in the collaborative scheme shares, with a central hub (i.e., a model aggregator), the trained ML model produced using their respective data sets, but not the actual data used. The trained ML model may be provided as part of a trained ML model data set that also includes an important feature list and a missing feature generator implemented using a GAN.

The central hub receives a trained model data set from each participating entity. The training model data set is then used, along with an ensemble model training data set available to the central hub to train an ensemble model. Training the ensemble model includes determining which features needed as input for any of the received trained models are missing, ensuring the missing features are not on the important feature list, and generating the missing features using the GAN(s) associated with the ML models for which missing features are identified.

Using the ensemble model training data and the missing feature values generated using the missing feature generators, the ensemble model of the central hub is trained to make a single prediction based on inputs of the predictions of each of the trained ML models received from the participant entities.

After the ensemble model is trained, an entity seeking an answer to whether a given URL is a phishing attempt submits a prediction request data set to the central hub having the ensemble model. Any features need as inputs for the trained ML models from the participant entities are imputed using the GANs associated with the models. Then, the prediction request data set and any imputed missing feature values are used to execute the trained ML models. The results from each model are then used as inputs to the ensemble model, which produces a single answer based on the inputs. The single answer may, for example, be that the URL for which the prediction was requested is, or is not, likely to be part of a phishing attack.

End of Example

Figure 3:
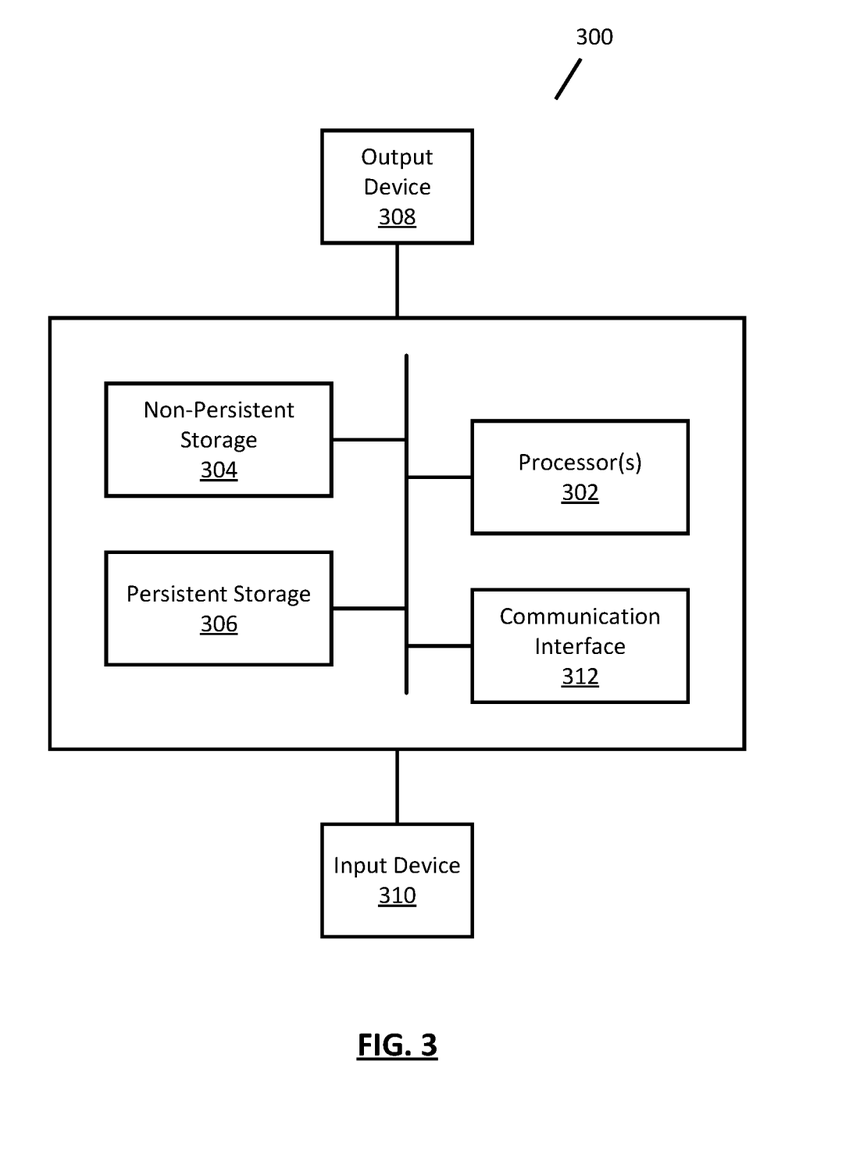
FIG. 3 shows a computing system in accordance with one or more embodiments of the invention.

As discussed above, embodiments of the invention may be implemented using computing devices. FIG. 3 shows a diagram of a computing device in accordance with one or more embodiments of the invention. The computing device (300) may include one or more computer processors (302), non-persistent storage (304) (e.g., volatile memory, such as random access memory (RAM), cache memory), persistent storage (306) (e.g., a hard disk, an optical drive such as a compact disk (CD) drive or digital versatile disk (DVD) drive, a flash memory, etc.), a communication interface (312) (e.g., Bluetooth interface, infrared interface, network interface, optical interface, etc.), input devices (310), output devices (308), and numerous other elements (not shown) and functionalities. Each of these components is described below.

In one embodiment of the invention, the computer processor(s) (302) may be an integrated circuit for processing instructions. For example, the computer processor(s) may be one or more cores or micro-cores of a processor. The computing device (300) may also include one or more input devices (310), such as a touchscreen, keyboard, mouse, microphone, touchpad, electronic pen, or any other type of input device. Further, the communication interface (312) may include an integrated circuit for connecting the computing device (300) to a network (not shown) (e.g., a local area network (LAN), a wide area network (WAN) such as the Internet, mobile network, or any other type of network) and/or to another device, such as another computing device.

In one embodiment of the invention, the computing device (300) may include one or more output devices (308), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (302), non-persistent storage (304), and persistent storage (306). Many different types of computing devices exist, and the aforementioned input and output device(s) may take other forms.

The problems discussed above should be understood as being examples of problems solved by embodiments of the invention and the invention should not be limited to solving the same/similar problems. The disclosed invention is broadly applicable to address a range of problems beyond those discussed herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for predicting results using ensemble models, the method comprising:
    receiving a first trained model data set from a first model source node, the first trained model data set comprising:
        a first trained model,
        a first critical feature list comprising critical properties of the first trained model data set, wherein the critical properties of the first training model data set are inputs for the first trained model relevant to a result produced by the first trained model, and
        a first missing feature generator configured to generate missing critical properties of the first trained model data set based on the first critical feature list;
    receiving a second trained model data set from a second model source node, the second trained model data set comprising:
        a second trained model,
        a second critical feature list comprising critical properties of the second trained model data set, wherein the critical properties of the second trained model data set are inputs for the second trained model relevant to a result produced by the second trained model, and
        a second missing feature generator, configured to generate missing critical properties of the second trained model data set based on the second critical feature list;
    receiving a prediction request data set comprising a third critical feature list, the third critical feature list comprising critical properties of the prediction request data set, wherein the critical properties of the prediction request data set are properties to be compared to the first critical feature list and the second critical feature list;
    making a first determination that the third critical feature list is missing at least one critical feature from the first critical feature list;
    generating, based on the first determination and using the first missing feature generator and using a General Adversarial Network (GAN), a first substitute feature to replace the at least one missing critical feature, to obtain a modified prediction request data set;
    executing the first trained model using the modified prediction request data set to obtain a first prediction;
    executing the second trained model using the prediction request data set to obtain a second prediction; and
    obtaining a final prediction using the first prediction and the second prediction as inputs to an ensemble model.

2. The method of claim 1, further comprising, before receiving the prediction request data set, training the ensemble model using an ensemble model training set and a plurality of missing feature values generated using a plurality of missing feature generators.

3. The method of claim 1, wherein the first missing feature generator is a GAN.

4. The method of claim 1, further comprising, before generating the first substitute feature, making a second determination that the at least one missing critical feature is not included in the first critical feature list, wherein generating the first substitute feature is further based on the second determination.

5. The method of claim 1, wherein the prediction request data set is received from an entity seeking a prediction related to a potential cyber-attack.

6. The method of claim 1, wherein:
    the first trained model data set is received from a first participant entity in a collaborative ensemble modeling service,
    the second trained model data set is received from a second participant entity in a collaborative ensemble modeling service, and
    no data used to train the first trained model and the second trained model is shared between the first participant entity and the second participant entity.

7. The method of claim 1, wherein the final prediction is obtained, at least in part, using a weighted average of the first prediction and the second prediction.

8. A non-transitory computer readable medium comprising computer readable program code, which when executed by a computer processor enables the computer processor to perform a method for predicting results using ensemble models, the method comprising:
    receiving a first trained model data set from a first model source node, the first trained model data set comprising:
        a first trained model,
        a first critical feature list comprising critical properties of the first trained model data set, wherein the critical properties of the first training model data set are inputs for the first trained model relevant to a result produced by the first trained model, and
        a first missing feature generator configured to generate missing critical properties of the first trained model data set based on the first critical feature list;
    receiving a second trained model data set from a second model source node, the second trained model data set comprising:
        a second trained model,
        a second critical feature list comprising critical properties of the second trained model data set, wherein the critical properties of the second trained model data set are inputs for the second trained model relevant to a result produced by the second trained model, and
        a second missing feature generator, configured to generate missing critical properties of the second trained model data set based on the second critical feature list;
    receiving a prediction request data set comprising a third critical feature list, the third critical feature list, comprising critical properties of the prediction request data set, wherein the critical properties of the prediction request data set are properties to be compared to the first critical feature list and the second critical feature list;
    making a first determination that the third critical feature list is missing at least one critical feature from the first critical feature list;
    generating, based on the first determination and using the first missing feature generator and using a General Adversarial Network (GAN), a first substitute feature to replace the at least one missing critical feature, to obtain a modified prediction request data set;
    executing the first trained model using the modified prediction request data set to obtain a first prediction;
    executing the second trained model using the prediction request data set to obtain a second prediction; and
    obtaining a final prediction using the first prediction and the second prediction as inputs to an ensemble model.

9. The non-transitory computer readable medium of claim 8, wherein the method performed by executing the computer readable program code further comprises, before receiving the prediction request data set, training the ensemble model using an ensemble model training set and a plurality of missing feature values generated using a plurality of missing feature generators.

10. The non-transitory computer readable medium of claim 8, wherein the first missing feature generator is a GAN.

11. The non-transitory computer readable medium of claim 8, wherein the method performed by executing the computer readable program code further comprises, before generating the first substitute feature, making a second determination that the at least one missing critical feature is not included in the first critical feature list, wherein generating the first substitute feature is further based on the second determination.

12. The non-transitory computer readable medium of claim 8, wherein the prediction request data set is received from an entity seeking a prediction related to a potential cyber-attack.

13. The non-transitory computer readable medium of claim 8, wherein:
the first trained model data set is received from a first participant entity in a collaborative ensemble modeling service,
the second trained model data set is received from a second participant entity in a collaborative ensemble modeling service, and
no data used to train the first trained model and the second trained model is shared between the first participant entity and the second participant entity.

14. The non-transitory computer readable medium of claim 8, wherein the final prediction is obtained, at least in part, using a weighted average of the first prediction and the second prediction.

15. A system for predicting results using ensemble models, the system comprising:
a model aggregator comprising memory and a processor comprising circuitry, operatively connected to a plurality of model source nodes, and configured to:
receiving a first trained model data set from a first model source node, the first trained model data set comprising:
a first trained model,
a first critical feature list comprising critical properties of the first trained model data set, wherein the critical properties of the first trained model data set are inputs for the first trained model relevant to a result produced by the first trained model, and
a first missing feature generator configured to generate missing critical properties of the first trained model data set based on the first critical feature list;
receiving a second trained model data set from a second model source node, the second trained model data set comprising:
a second trained model,
a second critical feature list comprising critical properties of the second trained model data set, wherein the critical properties of the second trained model data set are inputs for the second trained model relevant to a result produced by the second trained model, and
a second missing feature generator, configured to generate missing critical properties of the second trained model data set based on the second critical feature list;
receiving a prediction request data set comprising a third critical feature list, the third critical feature list, comprising critical properties of the prediction request data set, wherein the critical properties of the prediction request data set are properties to be compared to the first critical feature list and the second critical feature list;
making a first determination that the third critical feature list is missing at least one critical feature from the first critical feature list;
generating, based on the first determination and using the first missing feature generator and using a General Adversarial Network (GAN), a first substitute feature to replace the at least one missing critical feature, to obtain a modified prediction request data set;
executing the first trained model using the modified prediction request data set to obtain a first prediction;
executing the second trained model using the prediction request data set to obtain a second prediction; and
obtaining a final prediction using the first prediction and the second prediction as inputs to an ensemble model.

16. The system of claim 15, wherein the model aggregator is further configured to, before receiving the prediction request data set, train the ensemble model using an ensemble model training set and a plurality of missing feature values generated using a plurality of missing feature generators.

17. The system of claim 15, wherein the first missing feature generator is a GAN.

18. The system of claim 15, wherein the model aggregator is further configured to, before generating the first substitute feature, make a second determination that the at least one missing critical feature is not included in the first critical feature list, wherein generating the first substitute feature is further based on the second determination.

19. The system of claim 15, wherein the prediction request data set is received from an entity seeking a prediction related to a potential cyber-attack.

20. The system of claim 15, wherein:
the first trained model data set is received from a first participant entity in a collaborative ensemble modeling service,
the second trained model data set is received from a second participant entity in a collaborative ensemble modeling service, and
no data used to train the first trained model and the second trained model is shared between the first participant entity and the second participant entity.

* * * * *